US008818169B2

(12) United States Patent
Stewart et al.

(10) Patent No.: US 8,818,169 B2
(45) Date of Patent: Aug. 26, 2014

(54) DISC UNLOCK CODE DISTRIBUTION CONTROL VIA REMOTE PHYSICAL ACTION AND LOCATION

(75) Inventors: Russell Stewart, Los Angeles, CA (US); Timur Insepov, Sherman Oaks, CA (US)

(73) Assignee: Sony DADC US Inc., Terre Haute, IN (US)

( * ) Notice: Subject to any disclaimer, the term of this patent is extended or adjusted under 35 U.S.C. 154(b) by 119 days.

(21) Appl. No.: 13/077,263

(22) Filed: Mar. 31, 2011

(65) Prior Publication Data

US 2012/0251077 A1    Oct. 4, 2012

(51) Int. Cl.
*H04N 9/80* (2006.01)

(52) U.S. Cl.
USPC ............ 386/248; 386/253; 386/259; 709/227

(58) Field of Classification Search
USPC ............................ 386/248, 253, 259; 709/227
See application file for complete search history.

(56) References Cited

U.S. PATENT DOCUMENTS

| | | | | |
|---|---|---|---|---|
| 5,448,371 | A * | 9/1995 | Choi ............................. | 386/253 |
| 6,480,961 | B2 * | 11/2002 | Rajasekharan et al. ......... | 726/27 |
| 7,882,034 | B2 * | 2/2011 | Hug et al. ........................ | 705/52 |
| 2005/0039032 | A1 | 2/2005 | Babowicz et al. | |
| 2006/0023599 | A1 * | 2/2006 | Nozaki ....................... | 369/53.21 |
| 2006/0107283 | A1 * | 5/2006 | Murphy .......................... | 725/25 |
| 2006/0174353 | A1 * | 8/2006 | Ryal ............................... | 726/31 |
| 2006/0277607 | A1 * | 12/2006 | Chung ........................... | 726/27 |
| 2008/0098118 | A1 * | 4/2008 | Kutaragi et al. .............. | 709/227 |
| 2008/0133708 | A1 * | 6/2008 | Alvarado et al. ............ | 709/218 |
| 2008/0186164 | A1 * | 8/2008 | Emigh et al. ............ | 340/539.13 |
| 2008/0216145 | A1 * | 9/2008 | Barton et al. ................. | 725/131 |
| 2010/0087209 | A1 * | 4/2010 | Holm et al. .................... | 455/457 |
| 2010/0115026 | A1 * | 5/2010 | Katata et al. ................. | 709/203 |
| 2010/0246361 | A1 | 9/2010 | Miazzo et al. | |
| 2011/0304685 | A1 * | 12/2011 | Khedouri et al. .......... | 348/14.02 |
| 2012/0231817 | A1 * | 9/2012 | Holm et al. ................ | 455/456.3 |

FOREIGN PATENT DOCUMENTS

| JP | 2006073187 A | 3/2006 |
|---|---|---|
| WO | WO2005036812 A1 | 4/2005 |

* cited by examiner

*Primary Examiner* — Helen Shibru
(74) *Attorney, Agent, or Firm* — Trellis IP Law Group, PC (57) ABSTRACT

In one embodiment, a method of controlling playback of media content can include: receiving a delivery indication that a disc having media content stored thereon has been physically received by a user at a delivery location; receiving an authorization code and a disc identifier via a web interface, where the authorization code is determined by a disc player in response to the disc being inserted into the disc player; determining whether the user is authorized to playback the media content on the disc player based on the disc identifier, the delivery indication, and the authorization code; and providing an unlock code via the web interface if the user is determined to be authorized to playback the media content on the disc player, where the unlock code is to be entered via the disc player to allow the playback of the media content.

17 Claims, 7 Drawing Sheets

DISC UNLOCK CODE DISTRIBUTION CONTROL VIA REMOTE PHYSICAL ACTION AND LOCATION

CROSS REFERENCE TO RELATED APPLICATIONS

The following commonly owned and co-pending United States Patent Application is related to the present application and is incorporated by reference herein in its entirety: U.S. patent application Ser. No. 13/077,242 entitled SECURE ONLINE ACCESS CONTROL FOR ACCESSING MEDIA CONTENT FROM DISCS, by Russell Stewart et al., filed Mar. 31, 2011.

BACKGROUND

Protection of media content distribution is desirable, such as against unauthorized use or viewing of video in situations where unauthorized distribution may have a substantial impact on a title's revenue potential, or whenever a studio or content owner thinks a higher than normal set of security measures is required to protect video content. Specific examples suitable for controlled distribution include pre-release theatrical screeners distributed to the entertainment press and/or Oscar pre-theatrical release screeners that are sent out to the general membership of the Academy of Motion Picture Art and Sciences (AMPAS).

SUMMARY

Particular embodiments control distribution and playback of media content by including authentication codes and real world events, such as delivery of a disc with the media content, in order to retrieve an unlock code that allows playback of the media content.

In one embodiment, a method of controlling playback of media content can include: receiving a delivery indication that a disc having media content stored thereon has been physically received by a user at a delivery location; receiving an authorization code and a disc identifier via a web interface, where the authorization code is determined by a disc player in response to the disc being inserted into the disc player; determining whether the user is authorized to playback the media content on the disc player based on the disc identifier, the delivery indication, and the authorization code; and providing an unlock code via the web interface if the user is determined to be authorized to playback the media content on the disc player, where the unlock code is to be entered via the disc player to allow the playback of the media content.

In one embodiment, an apparatus having one or more processors, and logic encoded in one or more tangible media for execution by the one or more processors, when executed can be operable to perform such a method of controlling playback of media content.

In one embodiment, a non-transitory computer-readable storage medium having software encoded thereon for execution by one or more processors, when executed can be operable to perform such a method of controlling playback of media content.

A further understanding of the nature and the advantages of particular embodiments disclosed herein may be realized by reference of the remaining portions of the specification and the attached drawings.

DETAILED DESCRIPTION OF EMBODIMENTS

Particular embodiments are directed to protection of disc-based media content (e.g., video, audio, etc.) from unauthorized viewing. For example, authentication for viewing may include both real-world and Internet-based layers of security in the form of inputs for determining such authentication. In certain embodiments, an authorization key or code (e.g., an "unlock" code), required playback files, or any files and/or controls associated with playback (e.g., Java, playlists, etc.), for media content on a disc may be provided to a user once a series of authentication steps have been successfully completed. For example, the user may need to receive physical delivery of a disc at a delivery address, and also receive the unlock code via an Internet-connected device. In addition, the multiple layers of security may be selectively applied based upon a value (e.g., desired security) of the media content on the disc.

A secure disc in certain embodiments may prevent video playback until an unlock code (e.g., a 4 digit code) is entered into the disc player, such as via the remote control. For example, a different unlock code may be selected from an on-disc code matrix and/or randomly chosen each time the disc is inserted into a disc player, thus possibly requiring the user to obtain a new unlock code (e.g., from a centralized server) each time the user wishes to play the disc. Standard disc players and computer drives can be utilized in certain embodiments, which may also combine several different forms of copy control and various other deterrents to prevent unauthorized viewing or distribution of disc media content. For example, add-on DVD copy protection products, such as ARccOS (Advanced Regional Copy Control Operating Solution), a product of Sony DADC, may be employed for copy protection or rip deterrence. In addition, individual watermarking may be tied to each end-user, one-time secondary codes may be used to control embargo and expiration of discs, and clearly marked, customized labeling may also be employed to further highlight disc sharing risks.

Particular embodiments may thus utilize various layers of security to prevent unauthorized playback of disc media content. Watermarking, plus an additional technology to control and track screeners, may be utilized in addition to performing verification prior to allowing media content playback. In addition, embargo and expiration of discs can allow for specification of allowable dates or date ranges for playback. Further, additional "chain-of-custody" and forensic data collection points, as well as "door-to-door" shipment tracking and usage reporting can be used to fully track physical disc locations. In addition, playback of media content can be controlled based on geographic limitations (e.g., within a predetermined distance away from the disc delivery location). In this fashion, particular embodiments can accommodate advanced and multi-layer copy protection for disc media content.

Various metadata related to discs (e.g., digital video discs [DVDs], Blu-ray discs [BDs], etc.) can be stored in a centralized database and used to control playback of the media content on the discs. As discussed above, embargo dates can be specified such that a certain disc may not be played prior to a given date. Also, expiration dates can be specified such that a certain disc may not be played after a given date. In certain embodiments, usage of media content on a distributed disc (e.g., a DVD) may be based on real-world events, such as the delivery of a package, and the ability to combine different types of events (e.g., using a disc player, using a separate device, etc.) to provide multiple actions that must be taken in order to view the video or other media content on the disc.

For example, an unlock code may be provided to a user only if that user has successfully received delivery of the disc (e.g., a DVD) at a particular delivery address, has requested the unlock code from a suitably close location to the delivery address, and has met other predetermined criteria for the particular disc. As another example, a disc that is outside of, e.g., the Blu-ray specification, may be distributed whereby the download of playback control files may be required in order to interpret the video or other media content files on the disc. In this fashion, control of screener distribution and piracy prevention can be accommodated in particular embodiments.

Figure 1:
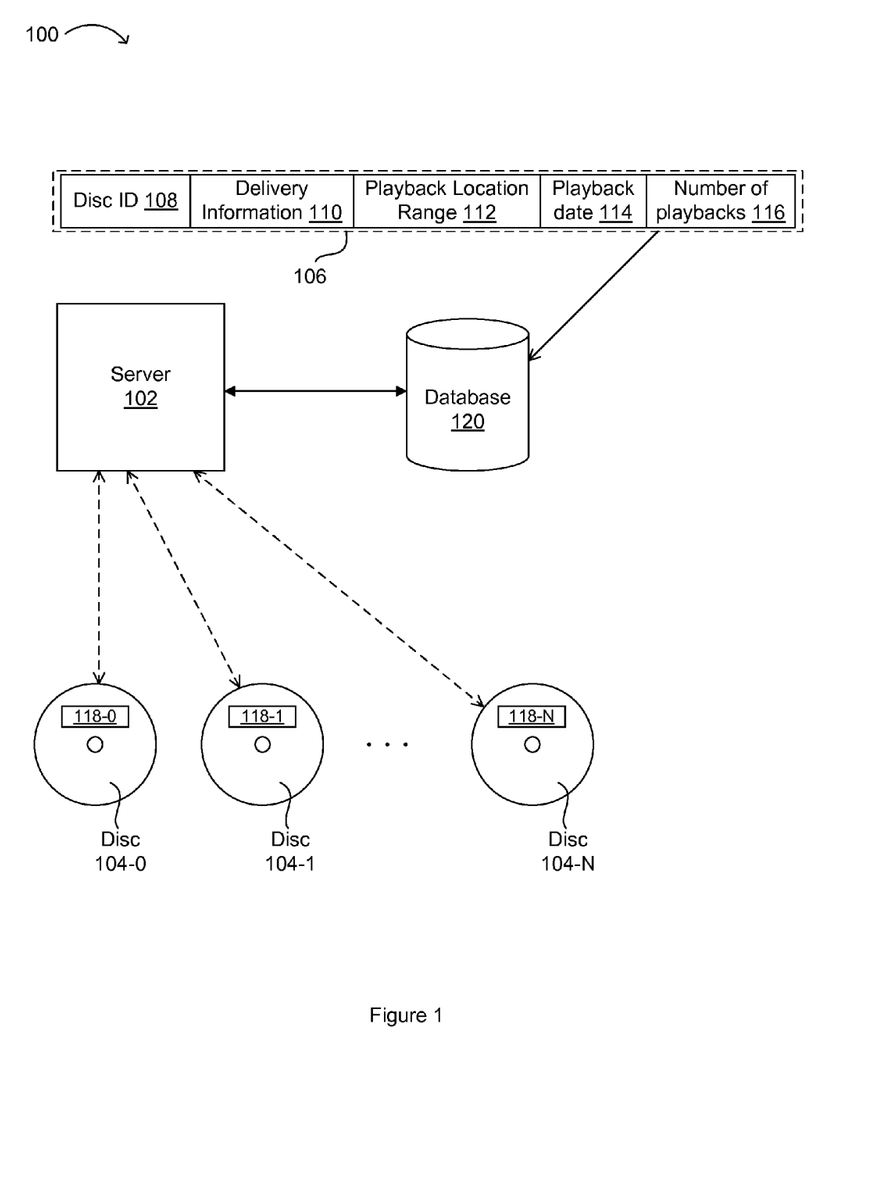
FIG. 1 depicts an example disc distribution and server control system.

Referring now to FIG. 1, shown is an example disc distribution and server control system 100. Any number of discs 104 (e.g., 104-0, 104-1, ... 104-N) may be distributed, such as to a group of pre-release screeners. Each disc 104 can also include corresponding customized labels 118 (e.g., 118-0, 118-1, ... 118-N), such as including a name for each screener or end recipient. Each disc 104 may include media content to be screened or otherwise viewed, and an unlock code may be needed in order to playback the media content on disc 104. Alternatively or additionally, various playback control files may not be included on disc 104, but may need to be downloaded in order to playback the media content on disc 104. Server 102 can essentially track distributed discs 104 by use of entries 106, which may include various metadata associated with each distributed disc 104. For example, entries 106 may be in a database 120 that is either separate from (as shown), or included within server 102.

Each entry 106 can include various information or metadata that may be used to validate or authenticate a disc 104 and/or a user or viewer of the media content on disc 104. For example, each entry 106 can include disc identifier 108, delivery information 110, playback location range 112, playback date 114, and a number of playbacks allowed 116. Disc identifier 108 may be a control code used to check corresponding information in database 120. In some embodiments, other identifiers (e.g., personal identifiers) may be used in place of an actual disc identifier. Delivery information 110 can include a physical address as a destination of the shipped disc, as well as delivery confirmation information (e.g., a digitized signature of the user, electronic delivery tracking information, etc.), or any shipping information used to track a package during delivery.

Playback location range 112 may indicate an allowable playback area defined as a specific distance that the user can be from the physical address of delivery and still be able to receive an unlock code. For example, the location of the user may be determined by a geo-location service that identifies a real-world geographic location of an object (e.g., a mobile phone or an Internet-connected computer terminal) of the user. In this fashion, a look-up may be performed on the Internet protocol (IP) address of the device (e.g., a smart phone) that is used to make the unlock code request. The device used to make the unlock code request may be a separate device from the disc player, or the disc player itself may be Internet-enabled (e.g., a Blu-ray disc player).

Playback date 114 can include an embargo date (e.g., playback of the media content is not allowed until this date), an expiration date (e.g., playback of the media content is not allowed after this date), both embargo and expiration dates to define a range of allowable playback dates, or a single date. Number of playbacks 116 can include a number of actual times that media content from a disc is played, a number of times an unlock code can be redeemed for a particular disc, and/or a record of playback requests related to the disc in question. Any other suitable playback permissions and/or restriction parameters can be stored in entry 106 of database 120, such as other unique identifiers, geographic region restrictions, a number of authorized machines, a duration of authorization, an account termination date, to name only a few.

Suitable copy protection and authenticity mechanisms, such as a burst cutting area (BCA) that can be utilized for disc identification and/or validation purposes. BCA can refer to the circular area near the center of a DVD, high-definition DVD (HD DVD) or Blu-ray disc, where a barcode can be written for additional information such as ID codes, manufacturing information, and serial numbers. BCA locations can also vary from a location near the disc hub, such as in a Blu-ray disc. The BCA can be written, e.g., using a laser to "cut" the identifier into the aluminum reflective layer of the finished disc, thus adding a unique identifier to each manufactured disc.

For example, BCA can be used to encode a unique serial number or disc identifier post-pressing in the manufacturing process of each disc 104. Discs as they come off a manufacturing line may also be entered into database 120 and tracked through the supply chain. For example, 10,000 discs may be designated as "screener" discs which are treated a certain way, and the next 100,000 discs off the line may be designated as "Best Buy" discs and are treated in a different way. BCA capture can be pushed or otherwise tracked in one or more databases 120 in a centralized fashion, such as in association with centralized server 102. In this fashion, many retail applications, in addition to disc distribution control, may benefit from knowledge as to where a particular disc 104 was sold or otherwise acquired.

In addition, transportation security for each disc 104 can be accommodated by shipping the discs with a "lock" that disallows playbacks regardless of any other factors until release of that lock by way of entry of an unlock code via a disc player. In certain embodiments, an unlock code may not be obtained unless electronic confirmation of a signature indicating receipt of the disc at a delivery location is received by server 102. In some cases, shipping confirmation may be sufficient in order to retrieve an unlock code for a disc. However, in other cases, other disc validation and viewer authentication mechanisms may be required prior to providing an unlock code to allow a user to view media content on a disc. In this fashion, a range of possible security layers can be enabled depending on the level of security protections desired.

Particular embodiments involve a digital rights management (DRM) aspect along with a copy control aspect to control media content distribution, and may be used during the production process for the delivery of early screeners or dailies, such as raw, unedited footage shot during the making of a motion picture. Certain embodiments may limit the authorized playback of disc-based media content by using personal identification number (PIN) and/or authentication code based locking techniques by adding an online component that tracks real-world actions (e.g., physical delivery, user location, time based criteria, etc.) to determine if a specific user is to be given an unlock or access code (or other direct authorization) to view the media content.

For example, a PIN or authentication code based locking mechanism may utilize a random function built into disc player hardware, or enabled via a Blu-ray Java virtual machine for Blu-ray disc applications, along with other programming, to display an authorization code (e.g., a DVD code) to the user. This authorization code can then be entered into an online authentication site via a web interface that may then return an unlock code to allow the user to view the media content. In addition, a back-end or centralized database 120 may be used to track a unique code (e.g., a disc identifier) that is assigned to each produced disc. For example, the unique disc identifier code may be displayed on the disc onscreen menu, as well as in the disc's metadata (e.g., disc identifier 108) that is used to determine if playback is authorized. In addition, for an example Blu-ray player connected to the Internet, the authorization code might itself be based on an external detail, such as a user's membership number, social security number, or any other unique identifier.

One example usage scenario for a DVD involves the protection of a pre-release theatrical presentation. In this scenario, the disc is prepared with the pin code locking mechanism that requires an unlock code in order to playback the disc. In addition, the disc may be assigned a unique serial number or a disc identifier, which can be embedded on the disc (e.g., in the BCA) during the manufacturing process. The relationship between the disc, the serial number or disc identifier, and its associated metadata may be stored in database 120 along with information regarding the overall allowable usage scenarios for the specific piece of media content on the disc. The disc 104 may be shipped to the consumer using a delivery service that has electronically integrated delivery notifications with database 120 such that at any given time the database is aware of the physical location of disc 104.

During the actual physical delivery, the delivery service may acquire the required delivery data, which can include but is not limited to, an electronic or electronic representation of a signature from the intended recipient. Notification of this physical delivery can then be entered into the appropriate field-based data acquisition system used by the delivery service, and the database used to track the disc status can be updated to reflect that the delivery condition has been met (e.g., delivery information 110 in entry 106). If notification of delivery is the only condition required for the release of the unlock code, any user in possession of the particular disc and a standard playback device can use the web-based unlock service (web interface) to retrieve an unlock code.

In some cases, depending on the level of security desired, one or more additional unlock conditions may be required to retrieve an unlock code. For example, the person attempting to retrieve an unlock code may need to be within a certain physical distance from the delivery address. This location can be determined through the use of an Internet protocol (IP) geo-location service. For example, if the delivery address is in Miami and there is 100 mile limit assigned to a media content title in the database (e.g., playback location range 112 in entry 106), any user in Fort Lauderdale would be able to initiate playback, but a user in Orlando would be denied an unlock code.

Figure 2:
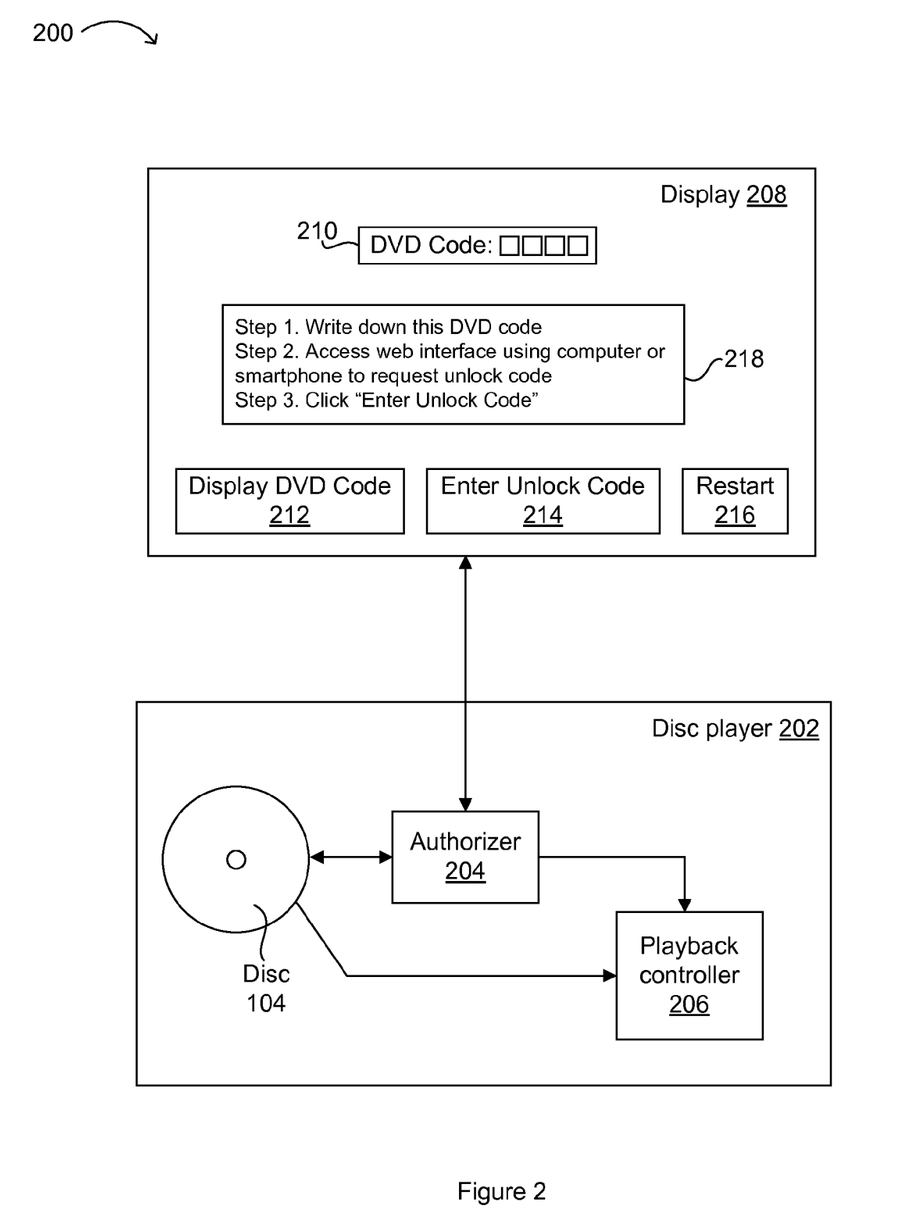
FIG. 2 depicts an example disc player and user interface arrangement.

Referring now to FIG. 2, shown is an example disc player and user interface arrangement 200. When a disc 104 is inserted to disc player 202 for playback, instructions and/or files that are used by disc player 202 to control this playback may not allow disc 104 to be played until the unlock code is received. For example, a menu system for disc player 202 may be blocked as to playback of the disc until a certain key sequence (e.g., the unlock code) is entered into disc player 202. Any suitable method of halting the playback function until the unlock code is entered can be accommodated in certain embodiments. Disc player 202 can be any suitable type of player (e.g., DVD, BD-Live, Blu-ray, etc.) for playing disc 104. Thus for example, while video that a user would like to view is already on disc 104, instructions (e.g., what video data to play, etc.) that are needed by disc player 202 in order to play that video data may not be enabled without the unlock code.

Disc 104 inserted in disc player 202 can be authorized using authorizer 204. Authorizer 204 can be any suitable processor or controller. For example, authorizer 204 can interface with display 208 in order to convey instructions to a user to determine if disc 104 is valid and/or a viewer of the media content on the disc is authenticated. Playback controller 206 can thus receive indications from authorizer 204 as to whether disc 104 can be played back. For example, when an unlock code is entered into disc player 202, authorizer 204 may indicate to playback controller 206 that disc 104 is to be played back.

In the example display 208, an entry 210 can be used to indicate a DVD or authorization code. For example, the authorization code may be determined by disc player 202 in response to disc 104 being inserted therein. Screen controls can be used to indicate whether the user wishes to display a DVD code 212 (selected as shown), enter an unlock code 214 (e.g., after the user has retrieved the unlock code via an Internet connected computer), or restart 216. Instructions 218 may be used to convey steps for the user in response to the user requesting to display the DVD code 212. For example, the requested DVD code can be shown in box 210, and instructions 218 can indicate that the user should write down or otherwise store this code. Instructions 218 can further indicate that the user can access a web interface (e.g., via a computer, smart phone, or other Internet-connected device) to request the unlock code. Instructions 218 also may indicate that after the user has obtained the unlock code, the code can be entered via disc player 202 (e.g., selected by enter unlock code control button 214).

Figure 3:
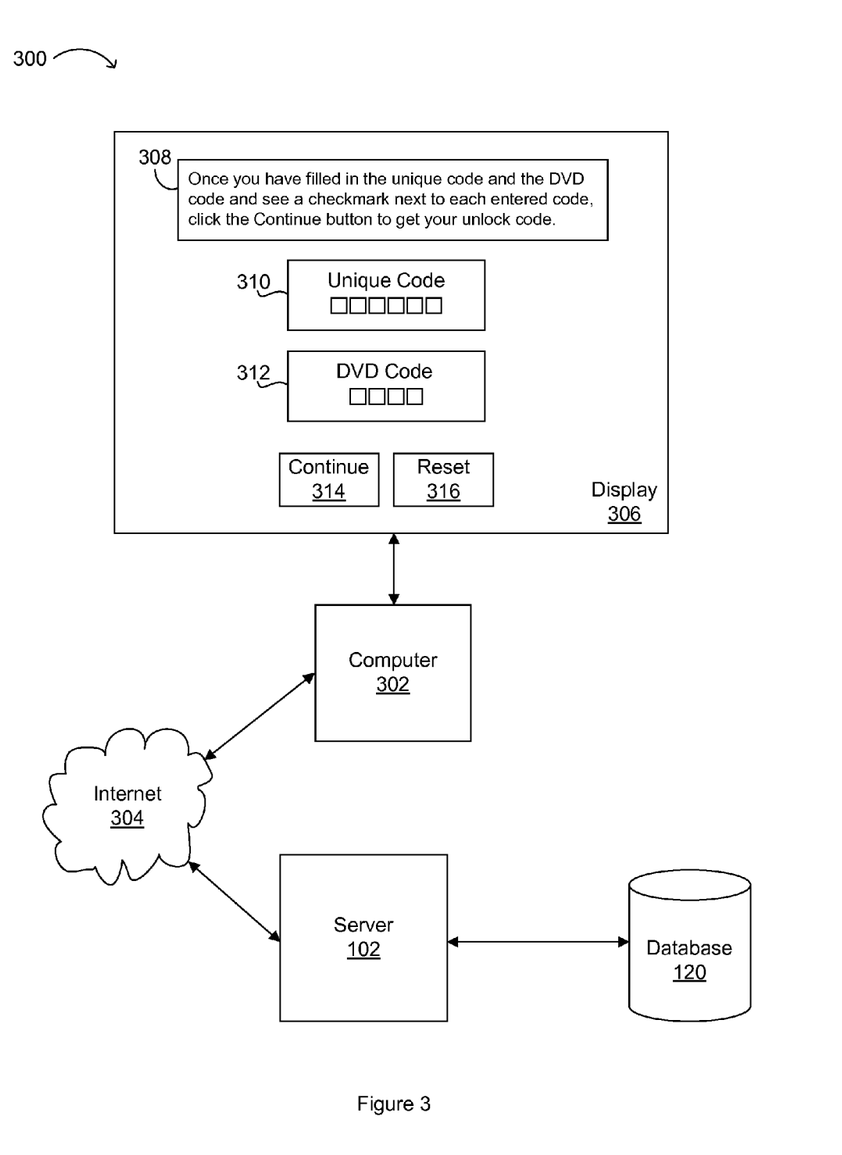
FIG. 3 depicts an example web interface to request an unlock code.

Referring now to FIG. 3, shown is an example web interface 300 to request an unlock code. In order for the user to retrieve the unlock code, computer 302 (e.g., a smart phone or other Internet capable device) can be used to access server 102 via Internet 304. When the user visits the web interface or designated website, the IP address, media access control identifier (MAC ID), geographic location, and Internet service provider (ISP) for the user may be acquired and appended to the record (e.g., entry 106) in database 120 to provide a clear chain of custody for the disc. If the particular disc player has Internet capability, a separate computer 302 may not be needed, but rather the disc player itself can access the web interface for authorization. In one implementation, such authorization (e.g., obtaining an unlock code) for an Internet-enabled Blu-ray disc player may be performed substantially automatically.

In FIG. 3, display 306 coupled to computer 302 shows an example web interface for obtaining the unlock code. Instructions 308 may indicate that the user is to fill in the unique code (e.g., at box 310) and the DVD code (e.g., at box 312). As discussed above, the unique code may be a disc identifier found on the disc (e.g., in the BCA, on the customized label 118, etc.) and/or disc sleeve, and this code can be unique for each particular distributed disc 104. Alternatively, the unique code or other authorization code may be a personal identification number not necessarily related to the disc player or to the particular disc. The DVD code may be an authorization code that is determined by the disc player itself (e.g., randomly chosen, by using an on-disc code matrix, etc.). Once the user has entered the unique code in box 310 and the DVD code in box 312, the user may request the unlock code by selecting the continue 314 button. Otherwise, reset button 316 may be used to reset inadvertently entered information, or to try again with new information.

Server 102 may be used to determine whether the user entering information for access to media content on a particular disc is authorized. Server 102 may determine access permission for disc playback by using a wide variety of parameters, and such may be stored in associated database 120. For example, a number of playback sessions allowable for disc 104 can be controlled based on awareness by server 102. Further, server 102 may be made aware of potential compromised disc accessed, e.g., by watching patterns of requests for data. For example, when used in the screener realm, a hacker or a repeated number of requests with a same disc number might indicate compromised access to the particular disc 104. Server 102 or a backend can then withhold the requested unlock code, and only allow a disc to be played back after suitable authentication.

The unique code entered by user at box 310 may first be checked by server 102 for validity. If the unique code is valid, the DVD code may then be checked by server 102. As discussed above, server 102 may access database 120 to additionally check a variety of parameters and/or metadata related to the disc and/or user. If providing an unlock code to the user is determined to be authorized by server 102, the proper unlock code may be determined by server 102. In one implementation, the code matrix found on disc 104 may also be replicated in database 120 so that server 102 is able to determine the proper unlock code corresponding to the DVD code generated by the disc player and entered by the user. For example, the relationship between a particular disc and its associated matrix (e.g., among a plurality of such matrices for different discs 104) may be determined during manufacturing and stored in database 120. The unlock code provided may also have a built-in expiration time (e.g., "x" hours), after which the provided unlock code will no longer be valid and the disc can no longer be viewed by the user. In this fashion, an unlock code can be determined and managed to control user access to disc media content.

Figure 4:
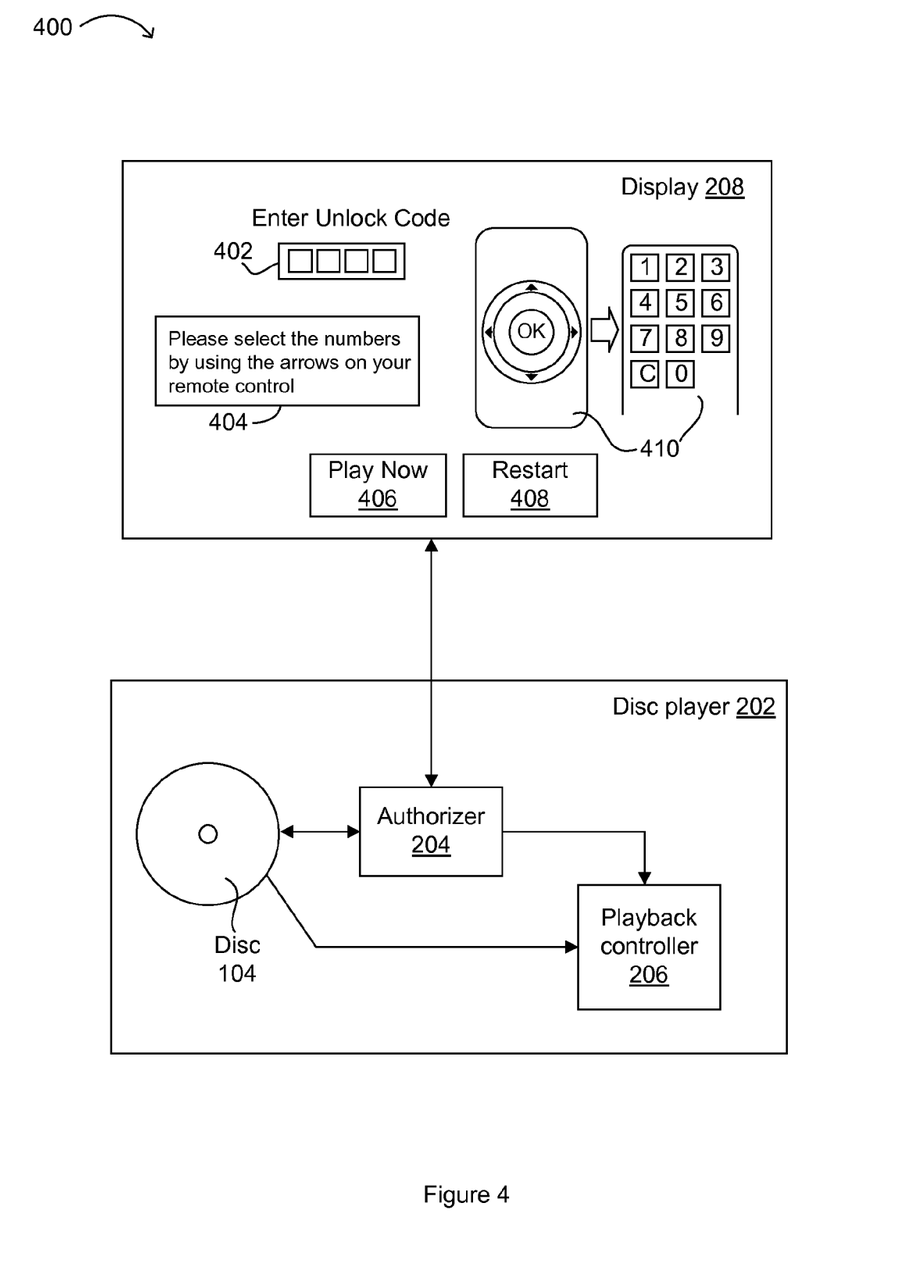
FIG. 4 depicts an example disc player and user interface arrangement for entering the unlock code.

Referring now to FIG. 4, shown is an example disc player and user interface arrangement 400 for entering the unlock code. This screen may appear in response to the user selecting the unlock code entry button 214 (see, e.g., FIG. 2) once the unlock code has been retrieved from server 102. Here, the unlock code as entered (e.g., digit by digit) may be shown in box 402. Instructions 404 may indicate that remote control 410 may be used to enter digits for the unlock code. For example, a digit to be entered in box 402 may be underlined or otherwise highlighted, and arrow keys on remote 410 can be used to select a corresponding highlighted entry key (e.g., 1, 2, 3, ... C[clear], 0, etc.). Alternatively, keypad numbers or characters (e.g., alphanumeric characters) can be directly entered via remote control 410. In order to restart the unlock code entry process, restart button 408 can be used. Once the unlock code is suitably entered and shown in box 402, the play now button 406 can be used to initiate playback of the media content on disc player 202.

Figure 5:
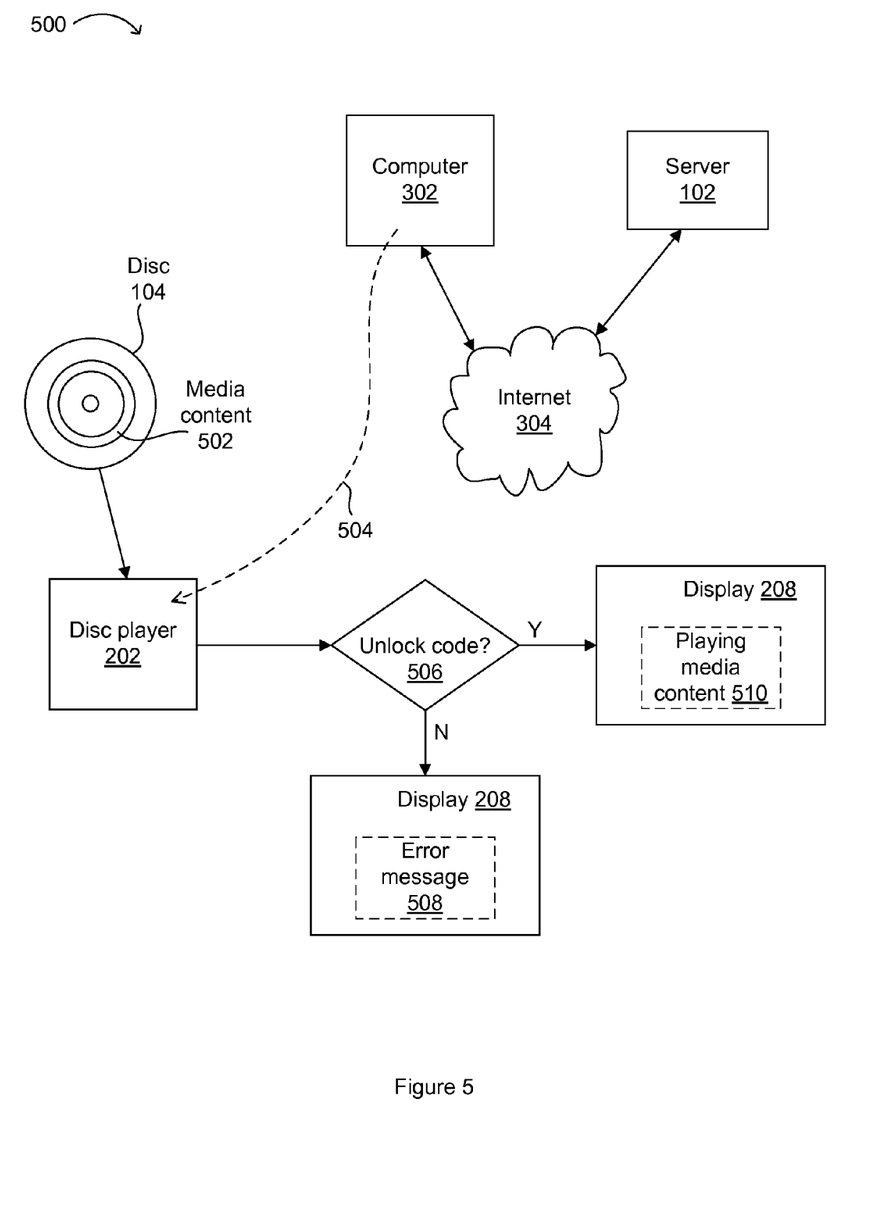
FIG. 5 depicts an example authentication flow to view media content.

Referring now to FIG. 5, shown is an example authentication flow 500 to view media content. Disc 104 may be inserted into disc player 202 for playback of media content 502. However, because disc player 202 may not playback disc 104 without an unlock code, such code must first be obtained via computer 302 coupled to the Internet 304, or by using any other network providing access to server 102. If disc 104 is determined to be invalid and/or a viewer using disc player 202 is otherwise not authenticated, the unlock code may not be provided (506), and display 208 may display an error message 508. However, if the unlock code is successfully retrieved (506), display 208 (e.g., associated with disc player 202) can playback the media content (510) upon entry of the unlock code. In this fashion, an unlock code can be retrieved from computer 302 and supplied 504 to disc player 202.

For cases where disc player 202 is Internet enabled, a separate computer 302 need not be employed to access the unlock code. For these cases, the authentication may be carried out on the disc player itself, with a "handshake" between disc player 202 and backend database 120 being performed substantially automatically. For example, disc player 202 can display a menu that requests a user authentication code (e.g., a code other than an automatically obtained unlock code), which may vary between various implementations and is not limited to a number or code word, but could also use a biometric measure, such as a fingerprint or image recognition using a peripheral attached to disc player 202.

An Internet-enabled disc player (e.g., a Blu-ray player) may then check database 120 via server 102 for additional playback requirements, which can include a computer record of a delivery signature, verification of the user's location by IP address look-up, or in some cases the MAC ID of the machine making the request. Once the playback requirements have been met, software required for playback (e.g., required playback files, etc.) may be download to the Blu-ray player, and/or the unlock code may be provided if not already done so automatically, and playback of the media content (e.g., a video presentation) can commence. Examples of such non-disc based data or files required for playback of Blu-ray discs may include "BDefense" playlists (BDefense is a product of Sony DADC), Java to enable playback, descriptor files, Clpi files, Mpls files, an index.bdmv file, a MovieObject.bdmv file, and/or entire directories that might otherwise be found under, e.g., the Blue-Ray Movie (BDMV) directory.

Figure 6:
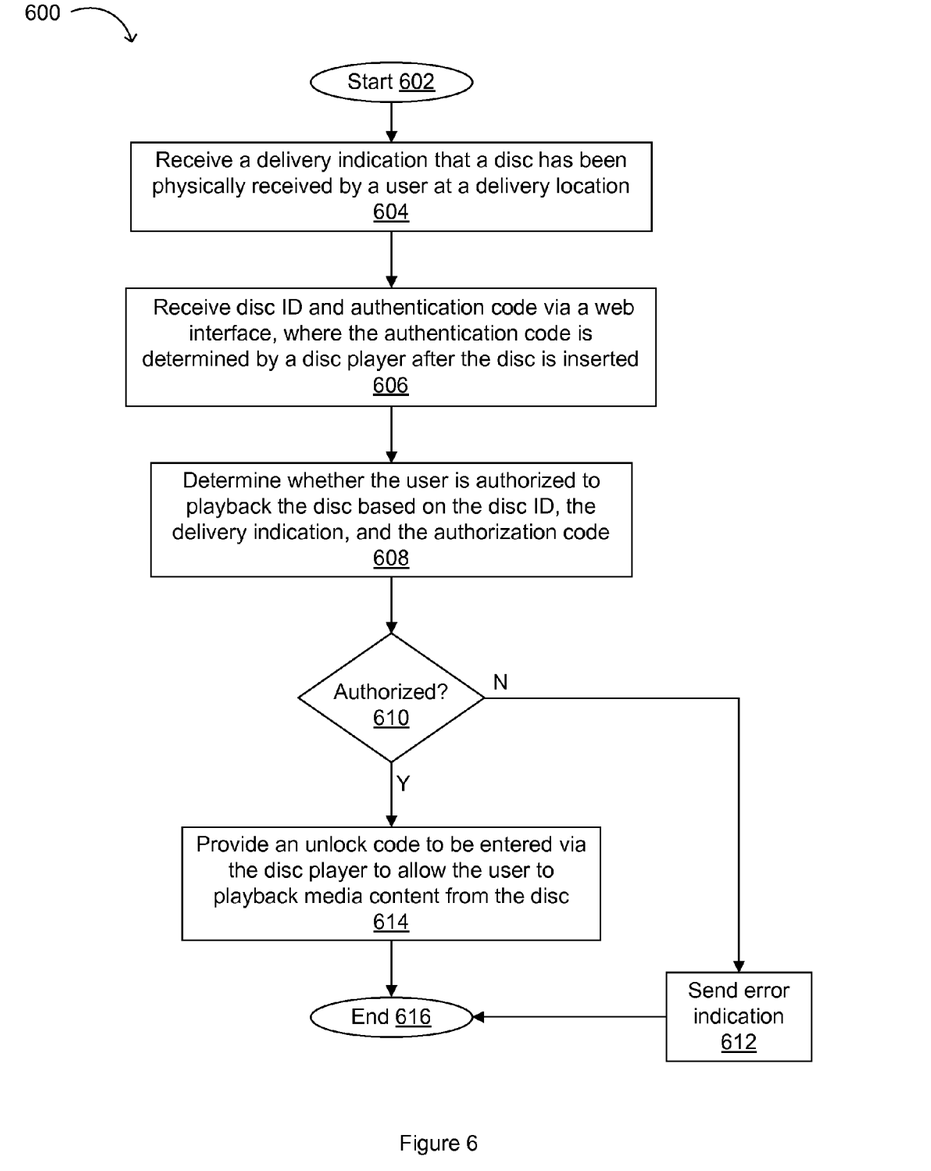
FIG. 6 is a flow diagram of an example method of controlling playback of media content.

Referring now to FIG. 6, shown is a flow diagram of an example method 600 of controlling playback of media content. The flow begins at 602, and at 604 a delivery indication that a disc has been physically received by a user at a delivery location can be received. For example, the delivery indication can include a digitized signature and/or other records associated with a product delivery. At 606, a disc identifier and authentication code can be received via a web interface. For example, the authentication code may be determined by a disc player after the disc is inserted into the player. At 608, the server can be used to determine whether the user is authorized to playback the disc. For example, this determination can be made based on the supplied disc identifier (e.g., the unique code), the authorization code (e.g., the DVD code), and the received delivery indication (e.g., electronic delivery notification).

If the user is determined to be unauthorized at 610, an error indication can be returned at 612 to complete the flow at 616. There are several situations that may cause withholding of the unlock code such that a disc player may refuse any further user interaction for playback of the disc. For example, the online database 120 associated with server 102 for disc verification may determine that the disc identifier (e.g., BCA number) returned by the disc is not valid. In such a case, the disc identifier received from the disc player may not match any corresponding number stored in a database entry, such as disc ID 108 in entry 106.

Another example whereby a disc player may refuse playback is where the online database 120 associated with server 102 for disc verification determines that the disc may have been set to only playback once, and that playback session has already taken place. For example, each requested playback for a certain disc identified by the disc identifier can be compared against a corresponding number stored in a database entry, such as number of playbacks 116 in entry 106. Thus, if the number of requested playbacks for a given disc exceeds the stored number of playbacks 116, the disc may be indicated as invalid, and playback accordingly refused by way of denial of the unlock code.

If online database 120 determines (via server 102) that the disc identifier (e.g., BCA) is valid and, e.g., a key exchange process completes without error, a user interaction portion of validation may commence for increased security. In this portion, the user may be asked to enter an external (e.g., off-disc, off-line, etc.) piece of information to verify that the user is the intended recipient of the disc. For example, such user verification information can include a number, a piece of text, a combination of text and numbers (alphanumeric characters), as well as speech recognition for voiceprint or voice characteristic analysis and matching, biometric matching, fingerprint matching, or any other suitable way of identifying a particular user.

In one Oscar screener application example, the recipient's AMPAS identification number can be provided as this second piece of authentication information. These numbers can be married with the disc identifier or BCA number prior to the shipment of the disc to provide a one-to-one relationship between a specific disc and a corresponding external validation code. In one example, such a relationship can only be altered on the database 120 and/or server 102 itself, and a shipping disc may not be aware of the concept of the off-disc code being required for playback. For example, playback date may be set by the disc manufacturer, the media content owner, or by the customer, and can be changed for any set of serial numbers by updating the online database 120. Once again, if the correct information is not entered, or if multiple incorrect entries are made, the server may refuse to provide an unlock code.

On the other hand, if the user is determined to be authorized at 610, an unlock code can be provided to the user at 614. As discussed above, this unlock code can then be entered via the disc player to allow the user to playback media content from the disc on the disc player. Further, code matrices (e.g., on-disc and in database 120) can be employed to correspond the unlock code with the authorization or DVD code determined by the disc player at 606. For example, the relationship between a particular disc and its associated matrix (e.g., among a plurality of such matrices for different discs 104) may be determined during manufacturing and stored in database 120.

Particular embodiments may also be used for allowing the purchaser of a multi-DVD set to start to watch video on a trial disc (e.g., a cover-mount disc that is included for free on a magazine) before the arrival of the rest of the disc set, but to only allow this once the set has been purchased. In addition, certain embodiments may allow the user to again restrict usage once the multi-disc set arrived at the user's home. Particular embodiments can also be utilized to restrict the viewing of privileged or adult material to a particular country or otherwise based on physical location.

Figure 7:
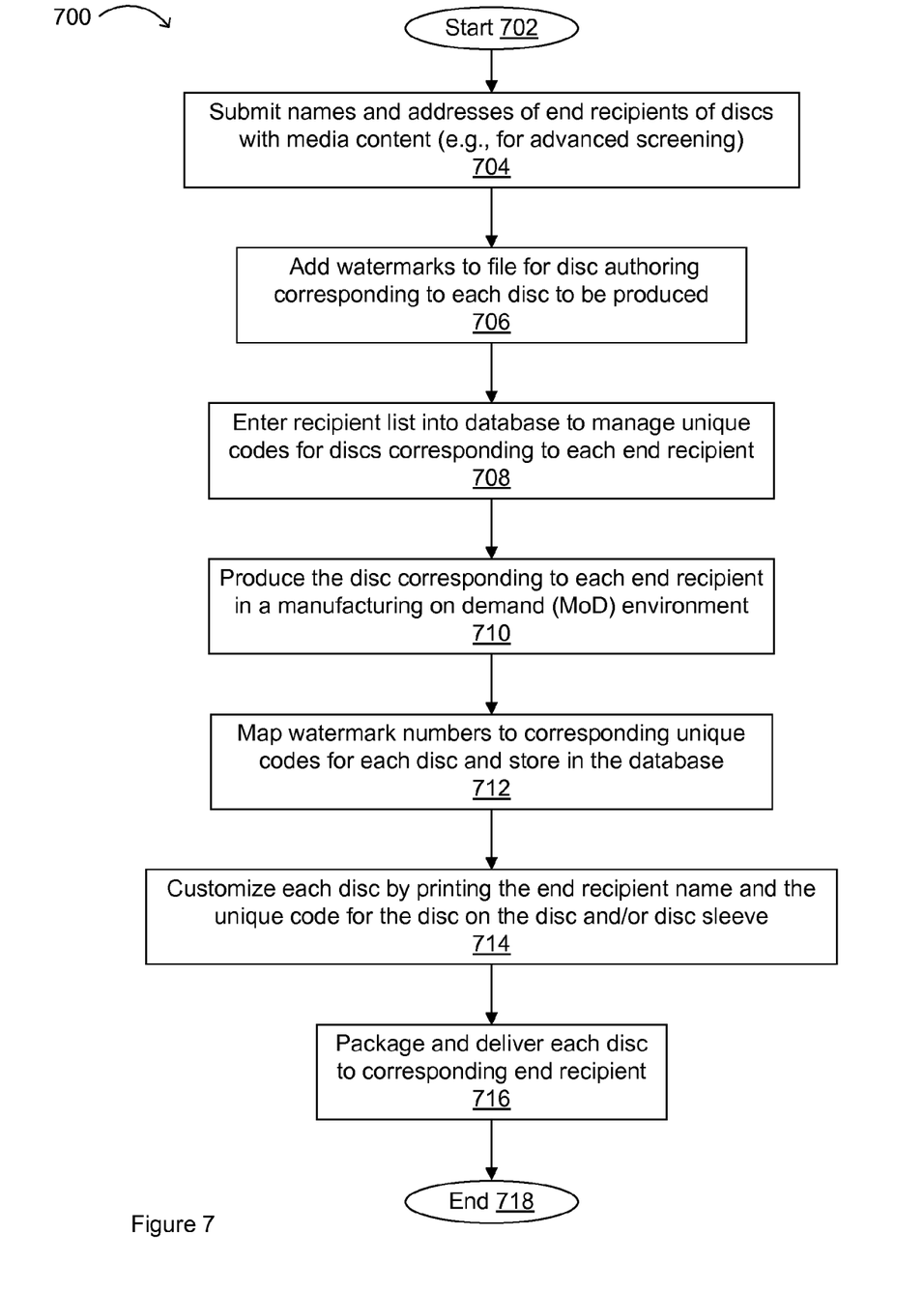
FIG. 7 is a flow diagram of an example method of making and managing discs for controlling distribution of the media content.

Referring now to FIG. 7, shown is a flow diagram of an example method 700 of making and managing discs for controlling distribution of the media content. The flow can begin at 702, and at 704 a list of names and addresses of end recipients of discs may be submitted. For example, an electronic file or document list may include such names and addresses of end recipients. Further, "Mezzanine" files, or compressed videos that take up less space than corresponding full resolution files may be trans-coded for disc authoring, and then watermarked. Watermarks can be added to the file for disc authoring corresponding to each disc to be produced at 706. Any suitable types of disc watermarks (e.g., visual for display on the screen during media content playback, invisible patterns overlapped on the video, audio patterns overlapped on the audio, etc.) can be added. The completed files for disc authoring with watermarks may, e.g., be sent to a manufacturing on demand (MoD) facility. At 708, the recipient list can be entered into a database to manage unique codes for discs corresponding to each end recipient.

At 710, the discs corresponding to each end recipient may be produced (e.g., in a MoD environment). For example, the code matrices may be rotated every "x" disc burns during this production to increase security. At 712, watermark numbers may be mapped to corresponding unique codes for each disc and stored in a database (e.g., database 120). At 714, each disc may be customized by printing the end recipient name and the unique code for the disc on the disc and/or disc sleeve. At 716, each disc may be packaged and delivered to corresponding end recipients, thus completing the flow at 718.

Particular embodiments also contemplate various reporting from centralized server 102 and database 120, and may be accessed by a suitably authorized manager. For example, the manager may view reports on the status of all outstanding screeners (e.g., all screeners that have received screener discs). Other reporting can include a delivery status of each disc 104, a list of users currently viewing media content or currently authorized to view media content (e.g., have received an unlock code) with mapping to the corresponding disc, a number of outstanding unlock codes, a list of discs that have been viewed, partially viewed, or that are unused, as well as other reports related to pre-defined subsets of users.

Email alerts (e.g., sent from server 102 to the manager's e-mail address) can also be set to trigger on multiple actions, and may contain various data about the activity and contact information for each user. Such e-mail alerts may include a reason for the alert, such as an incorrect disc in a registered disc player, a registration or authorization failure along with associated disc information, out of region playback attempts (e.g., outside of a predetermined radius surrounding the delivery address), and playback habits that exceed pre-set thresholds, as a few examples. The e-mail alerts may also include a user's playback history, as well as IP addresses and machine MAC ID's associated with an account, player or disc.

Although the description has been described with respect to particular embodiments thereof, these particular embodiments are merely illustrative, and not restrictive. For example, while discs and disc players have been described herein, other types of physical distribution-based mediums can be employed in particular embodiments. In addition, while a computer coupled to the server via the Internet is described herein, the server or other computing devices may be coupled to the disc player, or to other types of player via any suitable network (e.g., a virtual private network (VPN), etc.).

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method of controlling playback of media content, the method comprising:
   receiving a delivery indication that a disc having media content stored thereon has been physically received by a user at a delivery location;
   receiving an authorization code and a disc identifier via a web interface, wherein the authorization code is determined by a disc player in response to the disc being inserted into the disc player;
   determining whether the user is authorized to playback the media content on the disc player based on the disc identifier, the delivery indication, and the authorization code;
   determining a current location of the user;
   determining if the current location is less than a predetermined distance away from the delivery location; and
   if the user is determined to be authorized to playback the media content on the disc player, and if the current location is determined to be less than the predetermined distance away from the delivery location, providing an unlock code via the web interface wherein the unlock code is to be entered via the disc player to allow the playback of the media content.

2. The method of claim 1, wherein the delivery indication comprises electronic signature confirmation of the user.

3. The method of claim 1, wherein the determining whether the user is authorized to playback the media content comprises using associated metadata accessed from a database based on the disc identifier.

4. The method of claim 1, wherein the determining whether the user is authorized to playback the media content comprises checking a number of playbacks allocated for the disc and determining if the number of playbacks has been exceeded.

5. The method of claim 1, wherein the determining whether the user is authorized to playback the media content comprises comparing a date on which playbacks for the disc are allowed to occur against a current date.

6. The method of claim 1, wherein the unlock code automatically expires after a predetermined amount of time such that the playback of the media content on the disc player stops until a new unlock code is provided.

7. The method of claim 1, wherein the disc comprises a customized label for the user.

8. The method of claim 1, wherein a different authorization code is determined by the disc player each time the disc is inserted into the disc player.

9. The method of claim 1, wherein the providing the unlock code comprises providing a plurality of files that are required by the disc player for playback of the media content, wherein the disc does not include the plurality of files that are required for playback of the media content when delivered to the user.

10. An apparatus, comprising:
    one or more processors; and
    logic encoded in one or more tangible media for execution by the one or more processors, and when executed being operable to:
      receive a delivery indication that a disc having media content stored thereon has been physically received by a user at a delivery location;
      receive an authorization code and a disc identifier via a web interface, wherein the authorization code is determined by a disc player in response to the disc being inserted into the disc player;

determine whether the user is authorized to playback the media content on the disc player based on the disc identifier, the delivery indication, and the authorization code;

determine a current location of the user;

determine if the current location is less than a predetermined distance away from the delivery location; and if the user is determined to be authorized to playback the media content on the disc player, and if the current location is determined to be less than the predetermined distance away from the delivery location, provide an unlock code via the web interface, wherein the unlock code is to be entered via the disc player to allow the playback of the media content.

11. The apparatus of claim 10, wherein the delivery indication comprises electronic signature confirmation of the user.

12. The apparatus of claim 10, wherein the logic when executed that is operable to determine whether the user is authorized to playback the media content comprises logic when executed that is operable to use associated metadata accessed from a database based on the disc identifier, wherein the metadata comprises a number of playbacks allocated for the disc, and a date on which playbacks for the disc are allowed to occur.

13. The apparatus of claim 10, wherein the logic when executed that is operable to provide the unlock code comprises logic when executed that is operable to provide a plurality of files that are required by the disc player for playback of the media content, wherein the disc does not include the plurality of files that are required for playback of the media content when delivered to the user.

14. A non-transitory computer-readable storage medium having software encoded thereon for execution by one or more processors, and when executed being operable to:

receive a delivery indication that a disc having media content stored thereon has been physically received by a user at a delivery location;

receive an authorization code and a disc identifier via a web interface, wherein the authorization code is determined by a disc player in response to the disc being inserted into the disc player;

determine whether the user is authorized to playback the media content on the disc player based on the disc identifier, the delivery indication, and the authorization code;

determine a current location of the user;

determine if the current location is less than a predetermined distance away from the delivery location; and if the user is determined to be authorized to playback the media content on the disc player, and if the current location is determined to be less than the predetermined distance away from the delivery location, provide an unlock code via the web interface, wherein the unlock code is to be entered via the disc player to allow the playback of the media content.

15. The storage medium of claim 14, wherein the delivery indication comprises electronic signature confirmation of the user.

16. The storage medium of claim 14, wherein the software when executed that is operable to determine whether the user is authorized to playback the media content comprises software when executed that is operable to use associated metadata accessed from a database based on the disc identifier, wherein the metadata comprises a number of playbacks allocated for the disc, and a date on which playbacks for the disc are allowed to occur.

17. The storage medium of claim 14, wherein the software when executed that is operable to provide the unlock code comprises software when executed that is operable to provide a plurality of files that are required by the disc player for playback of the media content, wherein the disc does not include the plurality of files that are required for playback of the media content when delivered to the user.

\* \* \* \* \*